United States Patent

Bachmann et al.

Patent Number: 5,133,794
Date of Patent: Jul. 28, 1992

[54] METHOD OF MANUFACTURING OPTICAL FIBRES

[75] Inventors: Peter K. Bachmann; Hans-Jürgen E. Hagemann, both of Aachen, Fed. Rep. of Germany; Jacques P. M. Warnier, Eijsden, Netherlands; Howard J. C. Wilson, Aachen, Fed. Rep. of Germany

[73] Assignee: U.S. Philips Corp., New York, N.Y.

[21] Appl. No.: 728,809

[22] Filed: Jul. 11, 1991

Related U.S. Application Data

[60] Continuation of Ser. No. 407,384, Jul. 18, 1989, abandoned, which is a division of Ser. No. 206,644, Jun. 14, 1988, Pat. No. 4,871,383.

[30] Foreign Application Priority Data

Jun. 16, 1987 [DE] Fed. Rep. of Germany ....... 3720028

[51] Int. Cl.$^5$ ................... C08B 37/018; C03C 17/02
[52] U.S. Cl. ..................... 65/3.12; 65/18.2; 427/38; 427/163; 427/237
[58] Field of Search ................. 65/3.12, 18.2; 427/38, 427/39, 163, 167, 237

[56] References Cited

U.S. PATENT DOCUMENTS

| Re. 30,635 | 6/1981 | Kuppers | 427/39 |
| 4,263,032 | 4/1981 | Sinclair | 65/3.12 |
| 4,417,911 | 11/1983 | Cundy | 65/3.12 |
| 4,741,747 | 5/1988 | Geittner | 65/3.12 |

FOREIGN PATENT DOCUMENTS

| 220715 | 5/1987 | European Pat. Off. | 65/3.12 |
| 57-37538 | 8/1982 | Japan | 65/3.12 |
| 2079267 | 1/1982 | United Kingdom | 65/3.12 |

Primary Examiner—Kenneth M. Schor
Attorney, Agent, or Firm—Ernestine C. Bartlett

[57] ABSTRACT

Polarization-retaining optical fibres are manufactured according to the PCVD method, in which on the inside of a glass tube and, simultaneously on at least two glass rods which are arranged inside the glass tube such that their longitudinal axes run parallel to the longitudinal axis of the glass tube, glass is deposited in layers and the glass rods are removed from the glass tube upon completion of the glass deposition process. Alternatively, a single glass rod, the radial dimensions of which in two mutually perpendicular directions are in a ratio unequal to one, i.e. elliptical, is arranged in a glass tube such that its longitudinal axis coincides with the longitudinal axis of the glass tube.

4 Claims, 1 Drawing Sheet

METHOD OF MANUFACTURING OPTICAL FIBRES

This is a continuation of application Ser. No. 407,384, filed Jul. 18, 1989, now abandoned, which is a division of application Ser. No. 206,644 filed Jun. 14, 1988, now U.S. Pat. No. 4,871,383.

BACKGROUND OF THE INVENTION

The invention relates to a method of manufacturing optical fibres, in which glass is deposited in layers on the inner wall of a glass tube which is heated to a temperature between 1100° and 1300° C., and simultaneously on a glass rod which is arranged inside the glass tube, by leading a reactive gas mixture through the glass tube at a pressure between 1 and 30 hPa, while inside the glass tube a plasma is made to reciprocate strokewise between two reversal points after which the glass tube is made to collapse, following the deposition of a quantity of glass which corresponds to the intended construction of the optical fibre, so as to form a solid preform from which optical fibres are drawn.

A glass tube and a glass rod are to be understood to mean herein a substrate tube or a tube to be coated and a rod, which consist of synthetically manufactured amorphous silica or of amorphous silica manufactured from quartz crystals by melting fused silica, quartz glass, with the tube material possibly being doped, or which consist of both synthetically manufactured amorphous silica and amorphous silica manufactured from quartz crystals by melting (fused silica, quartz glass), with the tube material optionally being doped. The deposited glass consists of synthetically manufactured amorphous silica which is optionally doped.

The manufacture of optical fibres or optical waveguides according to the above-mentioned method is known from, U.S. Pat. No. Re. 30,635 and U.S. Pat. No. 4,314,833, the version in which the glass is simultaneously deposited on a glass rod arranged inside the glass tube, being known from U.S. Pat. No. Re. 30,635. The method of manufacturing except for said version is in practice referred to as "nonisothermal plasma-CVD-method" (nonisothermal PCVD method, in which P=plasma and CVD=chemical vapour deposition=-reactive deposition from the gas phase). In this method, glass layers are directly deposited from the gas phase on the inner wall of the glass tube (hetereogeneous reaction). In this way, the formation of glass soot in the gas phase is prevented; this is described in greater detail in, in particular, U.S. Pat. No. 4,314,833.

By means of the PCVD method both graded-index fibres and stepped-index fibres can be manufactured, with quantities of glass being deposited which correspond to the relevant construction of the fibre.

Single-mode optical fibres having radially symmetrical refractive index profiles can transmit both orthogonally polarized $HE_{11}$-modes. Mode-coupling is obtained by quasi statistically distributed internal and external interferences, so that light transmission while preserving the original direction of polarization is impossible with these fibres. However, polarization-retaining optical fibres are of great interest for applications in interferometry, in coherent optical communication systems, in non-linear optics etc. It is known that such fibres can be obtained by using refractive index profiles which are not radially symmetrical, i.e. having elliptical or other unround fibre cores (for example EP Patent 47,037, U.S. Pat. No. 4,106,847) or by stress-induced birefringence in the core by means of a non-circular, stress-producing optical cladding (for example U.S. Pat. No. 4,274,854). Many appropriate structures for polarization retaining fibres and methods of manufacturing such structures are described by, inter alia, R. H. Stolen et al. (Electron. Lett. 18 (1982) 764–765), T. Hosaka (Electron. Lett. 17 (1981) 530–531, R. D. Birch et al. (Electron. Lett. 18 (1982) 1036–1037) and S. C. Rashleigh and R. H. Stolen (Fiberoptic Techn. (May 1983) 155–160). As regards internal coating methods, all known manufacturing methods are based on mechanical processes to which the substrate tube is subjected (for example grinding or polishing), on deformation during collapsing using an underpressure or on chemical etching (for example gas phase etching or etching in combination with photolithographic means). However, all these techniques have the disadvantage that interfering with the customary fibre-manufacturing process is necessary, causing the introduction of impurities or problems with cracks occurring in the preform, or that the desired geometrical and optical profiles are only reproducible with great difficulties.

SUMMARY OF THE INVENTION

It is an object of the invention to provide a method which enables polarisation-retaining optical fibres to be manufactured by means of the PCVD method.

This object is achieved according to the invention in that in a method of the type described in the opening paragraph at least two glass rods are arranged inside the glass tube in such a way that their longitudinal axes run parallel to the longitudinal axis of the glass tube, and that the glass rods are removed from the glass tube upon completion of the glass deposition process.

The above-described object can alternatively be achieved according to the invention wherein (1) in a method of the type described in the opening paragraph, a glass rod is selected, the radial dimensions of which in two mutually perpendicular directions are in a ratio unequal to one, i.e. the glass rod is elliptical in configuration having an elliptical cross-section; (2) the glass rod is arranged in such a way that its longitudinal axis coincides with the longitudinal axis of the glass tube; and (3) the glass rod is removed from the glass tube upon completion of the deposition process.

In the first mentioned method according to the invention, preferably, at least two glass rods having a circular cross-section are arranged inside the glass tube. The advantage of the circular cross-section is that sufficiently rigid glass rods can readily be obtained from suitable fused silica material.

Moreover, in the first method according to the invention it is advantageous to select the diameter of the rods such that the ratio between the rod diameters and the inside diameter of the glass tube amount to between 0.2 and 0.7. Thus, the proper dependence of the layer thickness of the deposited layer on the angle is obtained.

In the latter mentioned method according to the invention, preferably, a glass rod is selected, the radial dimensions of which in two mutually perpendicular directions are in a ratio of from 1:1.5 to 1:4. This ratio has the advantage that the desired dependence of the layer thickness of the deposited layer can be obtained without having to meet requirements in the deposition process which are unsuitable for the PCVD method.

The possibility of generating a low-pressure plasma in the substrate tube by means of a microwave resonator is not adversely affected by the presence of glass rods in the tube. Rather, a deposition of doped or undoped quartz glass on the inner wall of the substrate tube and on the periphery of the rods present inside the tube takes place.

To bring about the deposition, a reactive gas mixture of $O_2$, $SiCl_4$ and gaseous dopants such as, for example, $GeCl_4$ or $C_2F_6$ are led through the tube-rod combination at a pressure between 500 and 2500 Pa, while in the glass-free inner space between the tube and the rod a plasma is reciprocated periodically between two reversal points. During the coating process, the tube-rod combination is heated to a temperature between 1300 and 1600K.

After glass has been deposited in layers in this way and according to the intended optical fibre construction, the rod or the rods is or are removed from the substrate tube and the tube only is made to collapse to obtain a solid preform from which an optical fibre is drawn.

Using the invented method, fibres of any desired refractive index gradient can be manufactured, for example, graded-index and stepped-index fibres having profiles with a predetermined angle-dependence of the refractive index.

In the method according to the invention, tube/rod combinations are used in order to deposit glass layers on the inner wall of the substrate tube, whose layer thickness differs along the periphery of the tube by means of the PCVD method in a simple manner.

Owing to the arrangement of the rods according to the invention, it is attained in the deposition of glass according to the PCVD method that the thickness of the layers deposited varies with a period of 180° along the periphery of the substrate tube.

First, the cladding glass is deposited and then the core glass is deposited. The layer thicknesses and the dopants are selected so that a single mode optical fibre can subsequently be manufactured from the preform. For an optimum realization of the object according to the invention, the refractive index difference $\Delta n$ between the core and the cladding should be as large as possible. Preferably, $\Delta n$ is adjusted to values between $7.5 \times 10^{-3}$ and $1.5 \times 10^{-2}$, which can be obtained, for example, by a $GeO_2$ doping in the core area and by an undoped, F-doped, or B-doped cladding.

After the coating process, the rods or the rod are or is removed from the substrate tube, and after collapsing a preform is obtained having an elliptical core and an elliptical optical cladding with large eccentricities which are retained during the drawing of the optical fibre.

The elliptical shape of the core leads to geometrical birefringence $B_g$ and, hence, to polarization-preservation in the single-mode optical fibre:

$$B_g \sim (\Delta N)^2 \sqrt{1 - (b/a)^2} \quad (1)$$

a = large semi-axis of the core ellipse
b = small semi-axis of the core ellipse.

When a cladding glass is deposited whose doping differs from that of the glass tube, such that the optical cladding and the outer substrate consist of differently doped glass, a stress birefringence $B_s$ occurs in addition to the geometrical birefringence, which further enhances the polarization-retaining property of the fibre-type manufactured according to the invention:

$$B_s \sim (P_{11} - P_{12}) \Delta \alpha \Delta T (A-B)/A+B) \quad (2)$$

$P_{11}$, $P_{12}$ = stress-optical coefficients
$\Delta \alpha$ = difference between the coefficients of thermal expansion of the optical cladding and the substrate cladding
$\Delta T$ = the difference between the softening temperature and the ambient temperature
A = large semi-axis of the cladding ellipse
B = small semi-axis of the cladding ellipse.

The stress-birefringence is particularly pronounced when, in an embodiment according to the invention, B-doped glass is deposited as an optical cladding.

BRIEF DESCRIPTION OF THE DRAWINGS

The invention will now be explained in greater detail by means of an example and with reference to a drawing, in which.

DETAILED DESCRIPTION OF THE PREFERRED EMBODIMENTS

In the example, preforms having a stepped-index profile were manufactured by means of the PCVD method. The resonator rate was 12 cm/s over a stroke length of 80 cm. Near the reversal points the rate of the resonator was reduced to nil over a distance of approximately 1 cm, and increased again to 12 cm/s in the opposite direction. The ratio of the $O_2$ flow to the chloride flow ($SiCl_4$ and $GeCl_4$) was 5:1. During the deposition process, the pressure was adjusted to 1800 Pa and the substrate temperature was 1500K. After the deposition process, the preforms were collapsed and measured in regard of the geometry of the deposited material and the refractive index difference between the deposited material and the $SiO_2$ substrate tube.

To demonstrate that the object according to the invention, i.e. the manufacture of polarization-retaining fibres using the PCVD method, is achieved, it was shown by way of experiment that due to the presence of two quartz rods in the substrate tube during the coating process a coating of deposited glass is formed which varies substantially along the circumference of the substrate tube. The rest, such as the manufacture of certain refractive index profiles and stress profiles forms part of the prior art.

Figure 2:
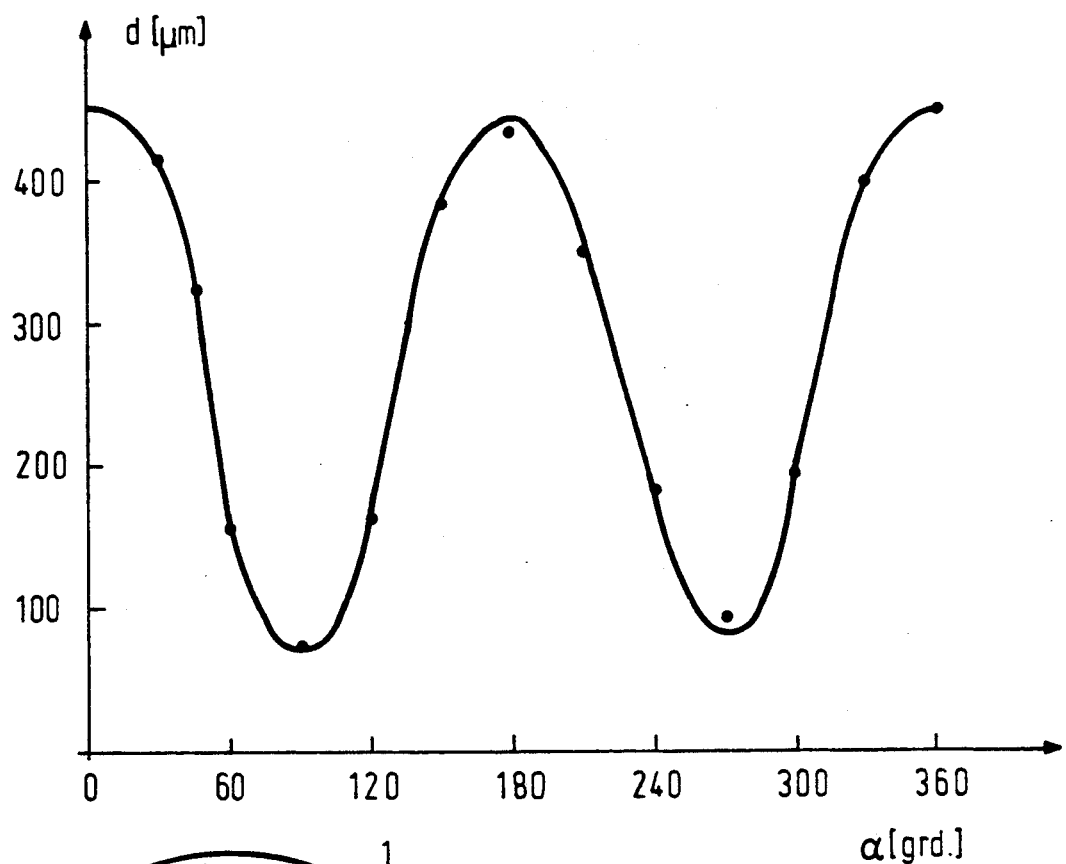
FIG. 2 is a diagrammatic representation of the angle dependence of the thickness of the layer deposited.
Figure 1:
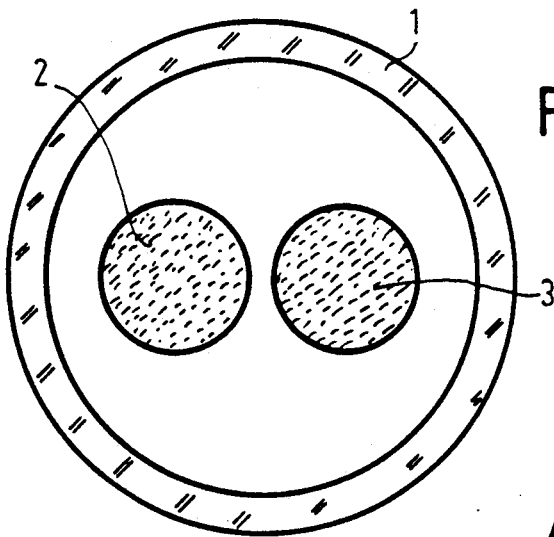
FIG. 1 is a cross-sectional view of two glass rods arranged in a glass tube.

The PCVD deposition was carried out in a substrate tube 1 having a 15 mm inside diameter of (1.5 mm wall thickness) using two quartz rod 2, 3, having a 5 mm each (see FIG. 1). The axes of the quartz rods run parallel to the axis of the substrate tube and their central axes were at a distance of 3 mm from the central axis of the substrate tube. The coating process was carried out using a $SiCl_4$ flow of 170 sccm, a $GeCl_4$ flow of 15 sccm, a $O_2$ flow of 935 sccm and a microwave power of 800 W. In this connection sccm means: cubic centimeter per minute, in relation to standard conditions (273K, 1013hPa). The wall thickness of the tube was measured before and after the coating process as a function of the circumferential angle $\alpha$. The angle-dependence of the thickness d of the deposited layer (FIG. 2) resulted from the difference. With a total stroke length of 80 cm, the layer thickness was over a distance of 77 cm not dependent upon the position along the axis of the tube. Due to the influence of the rods the layer thickness varies with a period of 180° between 75 $\mu$m and 450 $\mu$m (FIG. 2).

Figure 3:
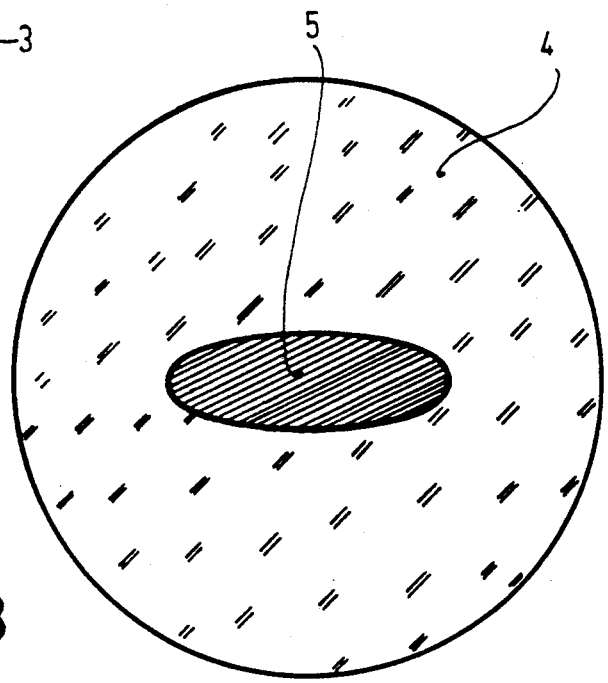
FIG. 3 is a cross-sectional view of a preform.

The preform was collapsed after the rods had been removed. Subsequently, the refractive index profile was measured as a function of the circumferential angle: the outer cross-section 4 of the preform was circular with a diameter of 10.5 mm and the deposited, $GeO_2$-doped quartz glass 5 had a non-circular cross-section with a large semi-axis of 2.6 mm and a small semi-axis of 1.1 mm (see FIG. 3). Thus, a numerical eccentricity of approximately 0.9 was obtained, which in the case of PCVD deposition of core and cladding regions according to the invention leads to pronounced geometrical and stress-induced birefringence. It is known, that in the case of eccentricities of the core and the optical cladding of 0.9 optical fibres are formed having excellent polarization retaining properties.

What is claimed is:

1. In the nonisothermal PCVD method of manufacturing optical fibers, comprising (1) employing said non-isothermal PCVD method to (a) directly deposit glass from the gas phase in layers on the inner wall of a glass tube whereby the formation of glass soot in the gas phase is prevented, which tube is heated to a temperature between 1100° and 1300° C., and (b) simultaneously deposit glass on a glass rod arranged inside the glass tube, the (a) and (b) depositing being carried out by passing a reactive gas mixture through the glass tube at a pressure between 1 and 30 hPa, while reciprocating a plasma strokewise between two reversal points inside the glass tube; and (2) collapsing the glass tube after the deposition of a quantity of glass so as to form a solid preform from which optical fibers are drawn; the improvement wherein a glass rod, elliptical in configuration and having an elliptical cross section along substantially its entire length, is arranged inside the tube such that the rod longitudinal axis coincides with the longitudinal axis of the glass tube, said elliptical glass rod being removed from the glass tube after completion of the non-isothermal PCVD deposition process and prior to said collapsing of the glass tube, the presence of said elliptical glass rod resulting in the fiber being formed as a polarization-retaining optical fiber.

2. A method as claimed in claim 1, wherein cladding glass is deposited on the tube inner wall and then core glass is deposited, the refractive index difference between core and cladding being adjusted to values between $7.5 \times 10^{-3}$ and $1.5 \times 10^{-2}$.

3. A method as claimed in claim 1, wherein a cladding glass is deposited on the tube inner wall, the doping of which cladding glass differs from that of the glass tube.

4. A method as claimed in claim 3, wherein boron-doped glass is deposited as the cladding glass.

* * * * *